(12) United States Patent
Pan et al.

(10) Patent No.: US 11,442,790 B2
(45) Date of Patent: Sep. 13, 2022

(54) RESOURCE SCHEDULING SYSTEM, METHOD AND SERVER FOR ENSURING HIGH AVAILABILITY OF SERVICES

(71) Applicant: Tencent Technology (Shenzhen) Company Limited, Guangdong (CN)

(72) Inventors: Xiao Dong Pan, Guangdong (CN); Lin Hong Hu, Guangdong (CN); Yan Mo, Guangdong (CN); Hong Zhu, Guangdong (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 223 days.

(21) Appl. No.: 16/437,264

(22) Filed: Jun. 11, 2019

(65) Prior Publication Data
US 2019/0294479 A1    Sep. 26, 2019

Related U.S. Application Data (63) Continuation of application No. PCT/CN2018/074609, filed on Jan. 30, 2018.

(30) Foreign Application Priority Data

Feb. 6, 2017 (CN) .......................... 201710068106.9

(51) Int. Cl.
*G06F 9/50* (2006.01)
*G06F 9/455* (2018.01)
(Continued)

(52) U.S. Cl.
CPC ............ *G06F 9/5077* (2013.01); *G06F 9/455* (2013.01); *G06F 9/45558* (2013.01); *G06F 9/50* (2013.01);
(Continued)

(58) Field of Classification Search
CPC .... G06F 9/5077; G06F 9/455; G06F 9/45558; G06F 9/50; G06F 2009/45562; H04L 29/08; H04L 67/10
See application file for complete search history.

(56) References Cited

U.S. PATENT DOCUMENTS

2010/0223309 A1* 9/2010 Benari ................ G06F 16/2246
707/912
2012/0266166 A1* 10/2012 Farkas .................. G06F 9/5077
718/1
(Continued)

FOREIGN PATENT DOCUMENTS

CN      102299929 A     12/2011
CN      103092675 A      5/2013
(Continued)

OTHER PUBLICATIONS

Chinese Office Action for CN Application No. 201710068106.9 dated Sep. 2, 2020 and translation (26 pages).
(Continued)

*Primary Examiner* — Meng Ai T An
*Assistant Examiner* — Willy W Huaracha
(74) *Attorney, Agent, or Firm* — Crowell & Moring LLP (57) ABSTRACT

This application relates to a resource scheduling method, a resource scheduling system, a server, and a storage medium. The resource scheduling method includes receiving a virtual machine application request sent by a terminal, wherein the virtual machine application request includes a target virtual machine label. The resource scheduling method further includes comparing the target virtual machine label with a current virtual machine label of each host computer in a cluster to determine a target host computer, wherein the target host computer includes no virtual machine label matching the target virtual machine label, enabling the target
(Continued)

host computer to create a first virtual machine, and setting a label of the first virtual machine as the target virtual machine label.

16 Claims, 8 Drawing Sheets

(51) Int. Cl.
    *H04L 65/40* (2022.01)
    *H04L 67/10* (2022.01)

(52) U.S. Cl.
    CPC .... *H04L 65/40* (2013.01); *G06F 2009/45562* (2013.01); *H04L 67/10* (2013.01)

(56) References Cited

U.S. PATENT DOCUMENTS

| | | | | |
|---|---|---|---|---|
| 2013/0097601 A1* | 4/2013 | Podvratnik | ............... | G06F 8/61 718/1 |
| 2013/0212279 A1* | 8/2013 | Dutta | ................... | G06F 9/5061 709/226 |
| 2014/0040893 A1* | 2/2014 | Karve | ................... | G06F 9/5077 718/1 |
| 2016/0062782 A1* | 3/2016 | Liu | ..................... | G06F 9/45558 718/1 |
| 2016/0162308 A1* | 6/2016 | Chen | ................... | G06F 9/45558 718/1 |
| 2018/0239633 A1* | 8/2018 | Li | ........................ | G06F 9/4401 |

FOREIGN PATENT DOCUMENTS

| | | |
|---|---|---|
| CN | 104008002 A | 8/2014 |
| CN | 104142848 A | 11/2014 |
| CN | 105446792 A | 3/2016 |
| CN | 105740040 A | 7/2016 |
| CN | 108399101 A | 8/2018 |
| EP | 3 048 529 A1 | 7/2016 |

OTHER PUBLICATIONS

International Search Report and Written Opinion with English Translation for International Application No. PCT/CN2018/074609; 11 pages.

\* cited by examiner

RESOURCE SCHEDULING SYSTEM, METHOD AND SERVER FOR ENSURING HIGH AVAILABILITY OF SERVICES

CROSS-REFERENCE TO RELATED APPLICATION(S)

This application is a continuation of International Patent Application No. PCT/CN2018/074609, filed on Jan. 30, 2018, which claims priority to Chinese Patent Application No. 2017100681069, entitled "RESOURCE SCHEDULING METHOD, APPARATUS, AND SYSTEM" filed with the Chinese Patent Office on Feb. 6, 2017, all of which are incorporated by reference herein in their entirety.

FIELD OF THE TECHNOLOGY

This application relates to the field of computer technologies, and in particular, to a resource scheduling method, a resource scheduling system, a server, and a storage medium.

BACKGROUND OF THE DISCLOSURE

With the development of computer technologies, it is becoming popular that government offices and enterprises build private clouds. Private clouds can provide stable, highly efficient, secured and isolated cloud resource environments for enterprise customers, perform flexible management on enterprise resources, and strive for optimized resource configuration. In addition, high availability is also a key demand in a private cloud environment, and therefore, how to ensure high availability of a service in a private cloud environment becomes very important.

SUMMARY

Embodiments of this application provide a resource scheduling method, a resource scheduling system, a server, and a storage medium.

According to some embodiments, a resource scheduling method may include receiving, by a cloud control server, a virtual machine application request sent by a terminal, the virtual machine application request including a target virtual machine label; comparing, by the cloud control server, the target virtual machine label with a current virtual machine label of each host computer in a cluster, to determine a target host computer, the target host computer having no virtual machine label matching the target virtual machine label; and enabling, by the cloud control server, the target host computer to create a first virtual machine, and setting a label of the first virtual machine as the target virtual machine label.

According to some embodiments, a resource scheduling method may include receiving, by a cluster control server, a virtual machine application request sent by a cloud control server, the virtual machine application request including a target virtual machine label; obtaining, by the cluster control server, a current virtual machine label of each host computer in a current cluster, and comparing the target virtual machine label with the current virtual machine label of each host computer in the cluster, to determine a target host computer, the target host computer having no virtual machine label matching the target virtual machine label; and enabling, by the cluster control server, the target host computer to create a first virtual machine, and setting a label of the first virtual machine as the target virtual machine label.

According to some embodiments, a resource scheduling system may include a cloud control server, configured to: receive a virtual machine application request sent by a terminal, the virtual machine application request including a target virtual machine label; determine a target cluster through a cluster scheduling policy according to the virtual machine application request; and forward the virtual machine application request to a cluster control server corresponding to the target cluster; and the cluster control server, configured to: obtain a current virtual machine label of each host computer in a current cluster, and compare the target virtual machine label with the current virtual machine label of each host computer in the cluster, to determine a target host computer, the target host computer having no virtual machine label matching the target virtual machine label; and enable the target host computer to create a first virtual machine, and set a label of the first virtual machine as the target virtual machine label.

According to some embodiments, a server may include a memory and a processor, the memory storing computer readable instructions, and the computer readable instructions, when executed by the processor, causing the processor to perform the following steps of receiving a virtual machine application request sent by a terminal, the virtual machine application request including a target virtual machine label; comparing the target virtual machine label with a current virtual machine label of each host computer in a cluster, to determine a target host computer, the target host computer having no virtual machine label matching the target virtual machine label; and enabling the target host computer to create a first virtual machine, and setting a label of the first virtual machine as the target virtual machine label.

According to some embodiments, a server may include a memory and a processor, the memory storing computer readable instructions, and the computer readable instructions, when executed by the processor, causing the processor to perform the following steps of receiving a virtual machine application request sent by a cloud control server, the virtual machine application request including a target virtual machine label; obtaining a current virtual machine label of each host computer in a current cluster, and comparing the target virtual machine label with the current virtual machine label of each host computer in the cluster, to determine a target host computer, the target host computer having no virtual machine label matching the target virtual machine label; and enabling the target host computer to create a first virtual machine, and setting a label of the first virtual machine as the target virtual machine label.

According to some embodiments, one or more non-transitory storage mediums may store computer readable instructions, the computer readable instructions, when executed by one or more processors, causing the one or more processors to perform the following steps of receiving a virtual machine application request sent by a terminal, the virtual machine application request including a target virtual machine label; comparing the target virtual machine label with a current virtual machine label of each host computer in a cluster, to determine a target host computer, the target host computer having no virtual machine label matching the target virtual machine label; and enabling the target host computer to create a first virtual machine, and setting a label of the first virtual machine as the target virtual machine label.

According to some embodiments, one or more non-volatile storage mediums may store computer readable instructions, the computer readable instructions, when executed by one or more processors, causing the one or more processors to perform the following steps of receiving a virtual machine application request sent by a cloud control server, the virtual machine application request including a target virtual machine label; obtaining a current virtual machine label of each host computer in a current cluster, and comparing the target virtual machine label with the current virtual machine label of each host computer in the cluster, to determine a target host computer, the target host computer having no virtual machine label matching the target virtual machine label; and enabling the target host computer to create a first virtual machine, and setting a label of the first virtual machine as the target virtual machine label.

Details of one or more embodiments of this application are disclosed in the following accompanying drawings and description. Other features, objectives, and advantages of this application will become obvious with reference to the description, accompanying drawings, and claims.

BRIEF DESCRIPTION OF THE DRAWINGS

To describe the technical solutions in the embodiments of this application more clearly, the following briefly describes the accompanying drawings required for describing the embodiments. The accompanying drawings and the corresponding description may be representative of some embodiments of this application, and a person of ordinary skill in the art may still derive other drawings from these accompanying drawings without undue experimentation.

DESCRIPTION OF EMBODIMENTS

In a conventional private cloud environment, usually, resources of all host computers are collected, and the resources are scheduled according to sizes and utilization rates of the resources, without considering impact on resources with a same service attribute during downtime of a host computer. For example, two or more virtual machines with a same service attribute are scheduled on a same host computer at the same time, and during downtime of the host computer, a whole service corresponding to the service attribute is affected.

Figure 1:
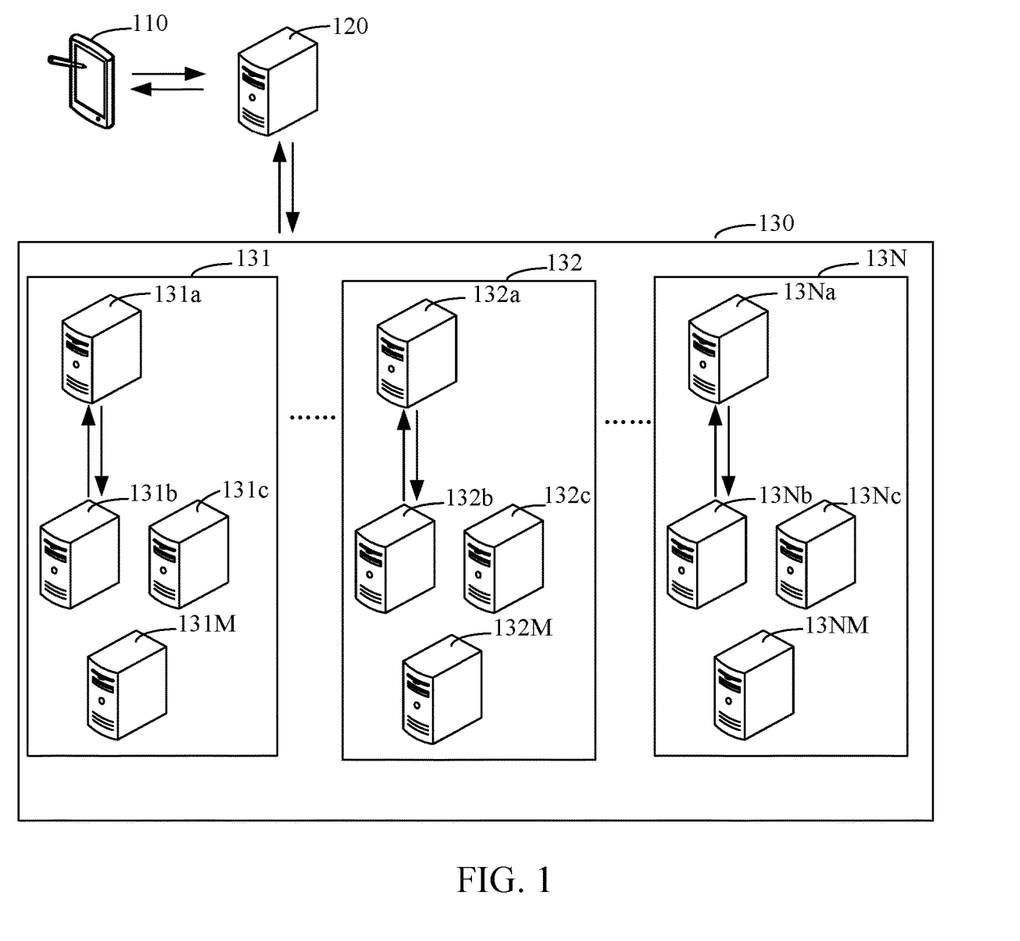
FIG. 1 shows a diagram of an application environment system for implementing a resource scheduling method according to an embodiment.

FIG. 1 is a diagram of an application environment in which a resource scheduling method runs according to an embodiment. As shown in FIG. 1, the application environment includes a terminal 110, a first server 120, and a cluster 130. The cluster 130 may include a plurality of clusters, and as shown in FIG. 1, may include a cluster 131, a cluster 132, ..., and a cluster 13N, and N is a total number of clusters. Each cluster has a corresponding cluster control server and a schedulable host computer. The cluster 131 includes a cluster control server 131a and schedulable host computers 131b, ..., and 131M, and M is a total number of schedulable host computers in the cluster 131. The terminal 110, the first server 120, and the cluster 130 communicate through a network, and the first server 120 may be a cloud control server.

The terminal 110 may be, but is not limited to, a smartphone, a tablet computer, a notebook computer, a desktop computer, and the like. A virtual machine application request may be sent to the first server 120 through the terminal 110. The first server 120 obtains a current virtual machine label of each host computer and compares the current virtual machine label with a target virtual machine label in the virtual machine application request, to determine a target host computer, thereby creating a first virtual machine on the target host computer and setting a label of the first virtual machine as a target virtual machine label. Alternatively, the first server 120 determines a target cluster through a cluster scheduling policy and forwards a virtual machine application request to a target cluster control server corresponding to the target cluster. The target cluster control server obtains a current virtual machine label of each host computer in a current cluster and compares the current virtual machine label with a target virtual machine label in the virtual machine application request, to determine a target host computer, thereby creating a first virtual machine on the target host computer and setting a label of the first virtual machine as the target virtual machine label. The target host computer has no virtual machine label matching the target virtual machine label. A virtual machine label represents a service attribute of a virtual machine and ensures that the target host computer has no virtual machine labels matching each other, so that when virtual machine labels matching each other are used to apply for virtual machines, the virtual machines may be applied for from different host computers, and virtual machines of a same service attribute can be deployed dispersedly and high availability of services is ensured.

Figure 2:
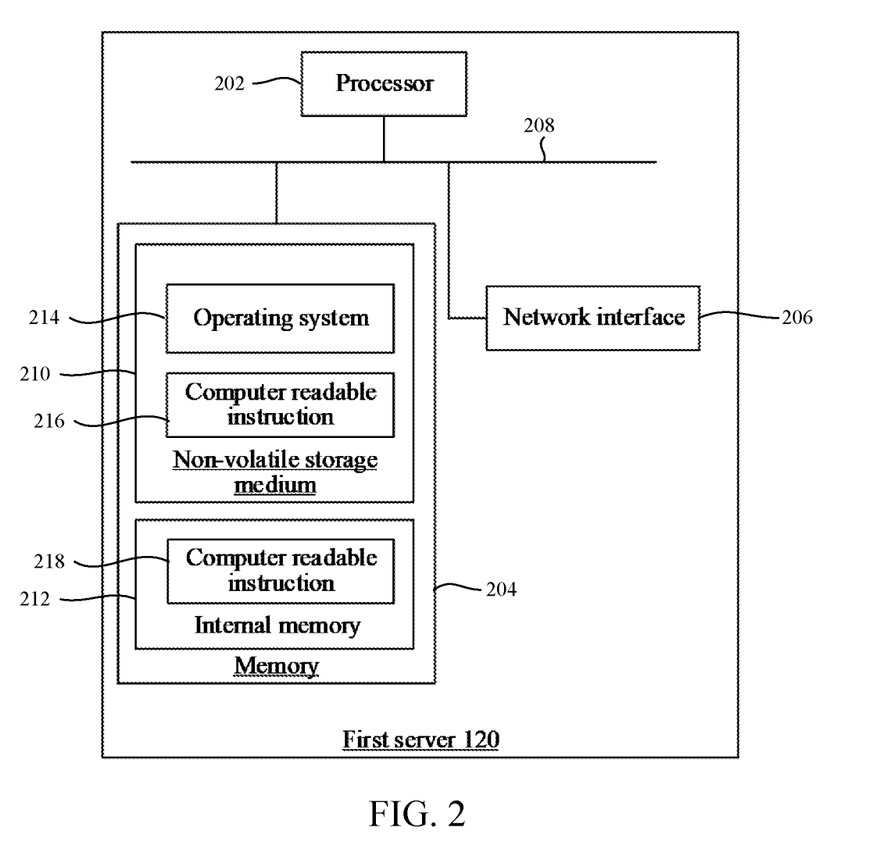
FIG. 2 shows an internal structural diagram of a first server illustrated in FIG. 1 according to an embodiment.

In an embodiment, an internal structure of the first server 120 in FIG. 1 is shown in FIG. 2. The first server 120 includes a processor 202, a memory 204, and a network interface 206 connected through a system bus 208. The memory 204 of the first server 120 includes a non-volatile storage medium 210 and an internal memory 212. The non-volatile storage medium 210 of the computer device 120 may store an operating system 214 and computer readable instructions 216. The computer readable instructions 216, when executed, may cause the processor 202 to perform a resource scheduling method. The processor 202 of the first server 120 is configured to provide computation and control capabilities and support operation of the whole first server 120. The internal memory 212 stores computer readable instructions 218. The computer readable instructions

218, when executed by the processor 202, may cause the processor 202 to perform a resource scheduling method. The network interface of the first server 120 is configured to communicate with the external terminal 110 and the cluster 130 through a network connection, for example, receive a request sent by the terminal 110 and send a request to the cluster 130.

Figure 3:
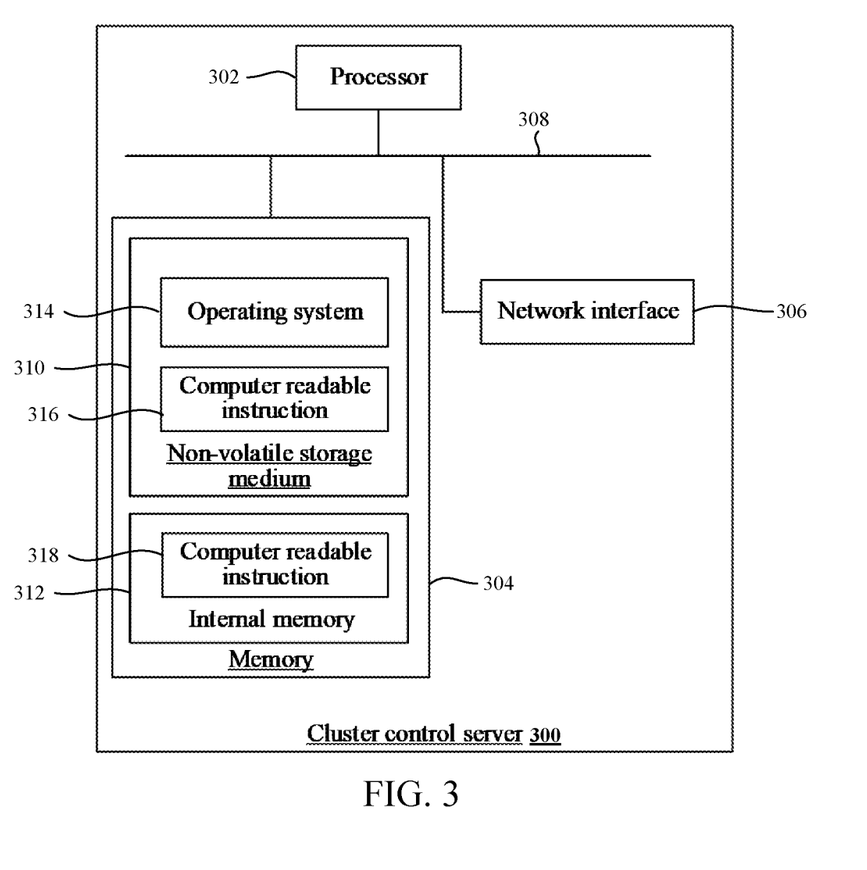
FIG. 3 shows an internal structural diagram of a cluster control server illustrated in FIG. 1 according to an embodiment.

In an embodiment, an internal structure of a cluster control server 300, representative of an internal structure for the cluster control servers 131a, 132a, . . . 13Na in FIG. 1, is shown in FIG. 3. The cluster control server 300 includes a processor 302, a memory 304, and a network interface 306 connected through a system bus 308. The memory 304 of the cluster control server 300 includes a non-volatile storage medium 310 and an internal memory 312. The non-volatile storage medium 310 of the computer device 300 may store an operating system 314 and computer readable instructions 316. The computer readable instruction 316, when executed, may cause the processor 302 to perform a resource scheduling method. The processor 302 of the cluster control server 300 is configured to provide computation and control capabilities and support operation of the whole cluster control server 300. The internal memory 312 stores computer readable instructions 318. The computer readable instructions 318, when executed by the processor 302, may cause the processor 302 to perform a resource scheduling method. The network interface 306 of the cluster control server 300 is configured to communicate with the external first server 120 through a network connection, for example, receive a request forwarded by the first server 120.

A person skilled in the art may understand that, the structures in FIG. 2 and FIG. 3 are only block diagrams of some structures related to the solution of this application and do not constitute a limitation to a terminal to which the solution of this application is applied. Specifically, the server may include more or fewer components than those shown in the figure, or some components may be combined, or a different component deployment may be used.

Figure 4:
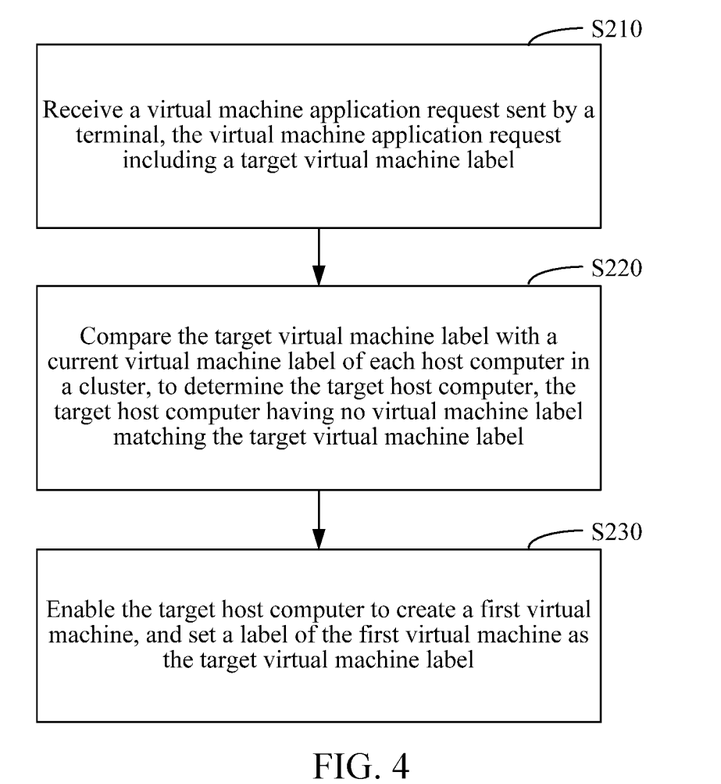
FIG. 4 shows a flowchart of a resource scheduling method according to an embodiment.

As shown in FIG. 4, in an embodiment, a resource scheduling method is provided. An example in which the method is applied in the first server in the foregoing application environment is used for description. The method includes the following steps:

Step S210: Receive a virtual machine application request sent by a terminal, the virtual machine application request including a target virtual machine label.

Specifically, the terminal may receive an input target virtual machine label through a virtual machine application page, such as a website, generate a corresponding virtual machine application request according to the target virtual machine label, and send the virtual machine application request to a cloud control server that may be a private cloud control server. The virtual machine application request is used to determine a target host computer according to the target virtual machine label and apply for a virtual machine on the target host computer. The target virtual machine label is used to identify a service attribute of a virtual machine, the service attribute includes at least one of a use attribute and a business attribute, and different attributes may be combined to obtain the service attribute. Virtual machine labels are configured for to-be-applied virtual machines, and then, uses of the to-be-applied virtual machines may be distinguished. Therefore, a qualified target host computer is determined according to a use of a virtual machine, so as to achieve proper utilization of resources and enhance high availability. The virtual machine application request may further include more information, such as at least one of cluster area information, a cluster name, user information, and virtual machine configuration information, to obtain a target cluster or verify a user privilege by using the information carried in the virtual machine application request. The virtual machine application request may include one or more target virtual machine labels, to apply for one or more virtual machines corresponding to the target virtual machine labels at the same time.

Step S220: Compare the target virtual machine label with a current virtual machine label of each host computer in a cluster, to determine a target host computer, the target host computer having no virtual machine label matching the target virtual machine label.

Specifically, the cloud control server is responsible for receiving a user request, and may check validity of the request, schedule, according to the request and a policy, the request to a suitable cluster control server for processing, and return a processing result to the user. The cloud control server may send the virtual machine application request to all cluster control servers, to obtain a current virtual machine label of host computers in all clusters returned by the cluster control servers, and perform comparison to determine the target host computer. Alternatively, a target cluster may be determined first according to a cluster scheduling policy, a current virtual machine label of host computers in the target cluster are then obtained, and the target host computer is determined through comparison. A specific quantity and range of to-be-selected host computers may be user-defined according to a requirement. A host computer is a computation node in a cluster and may be responsible for receiving a request sent by a cluster controller and makes a response. A host computer is also referred to as Hypervisor and is a middle software layer operating between a physical server and an operating system, can allow a plurality of operating systems and applications to share a set of basic physical hardware, can coordinate and access all physical devices and virtual machines on a server, and control, manage, and monitor a virtual sub-machine and a storage environment running on the host computer. A to-be-selected host computer can be used as the target host computer as long as it has no virtual machine label matching the target virtual machine label. A first obtained host computer that has no virtual machine label matching the target virtual machine label may be used as the target host computer, or host computers that have no virtual machine label matching the target virtual machine label may be added to a schedulable host computer set and then the target host computer is obtained according to a specific host scheduling policy. A virtual machine label matching the target virtual machine label refers to a virtual machine label that is exactly the same as or is similar to the target virtual machine label. Whether the virtual machine label and the target virtual machine label are similar may be determined according to a specific approximation algorithm. For example, similarity between a current virtual machine label and the target virtual machine label is calculated, if the similarity exceeds a preset threshold, the current virtual machine label and the target virtual machine label are determined to be similar, and if the similarity does not exceed the preset threshold, the current virtual machine label and the target virtual machine label are not determined to be similar. For example, a finance office and a finance department are matching virtual machine labels. The target host computer has no virtual machine label matching the target virtual machine label, and then, two same or similar virtual machine labels are allocated into different host computers, so that virtual machines with a same or similar service attribute can be deployed dispersedly, and during downtime of one host computer, other host computers may provide a same or similar service, to ensure high availability of services.

Step S230: Enable the target host computer to create a first virtual machine, and set a label of the first virtual machine as the target virtual machine label.

Specifically, after the cloud control server determines the target host computer, a virtual machine application request carrying information about the target host computer may be sent to a cluster control server where the target host computer is located, so that the cluster control server determines the target host computer according to the information about the target host computer and creates the first virtual machine on the target host computer. When creating the first virtual machine, the cluster control server allocates an appropriate amount of memory, a CPU, a network, and a magnetic disk to the first virtual machine, loads a client operating system of the first virtual machine, and sets the label of the first virtual machine as the target virtual machine label.

In this embodiment, the virtual machine application request sent by the terminal is received, the virtual machine application request including the target virtual machine label; the target virtual machine label is compared with the current virtual machine label of each host computer in the cluster, to determine the target host computer, the target host computer having no virtual machine label matching the target virtual machine label; and the target host computer is enable to create the first virtual machine, and the label of the first virtual machine is set as the target virtual machine label. Therefore, the virtual machine labels matching each other are allocated to different host computers, so that the virtual machines with the same or similar service attribute are deployed dispersedly, during downtime of one host computer, other host computers may provide the same or similar service, a capability of resources to serve the outside is enhanced through scheduling resources properly, and high availability of services is ensured.

Figure 5:
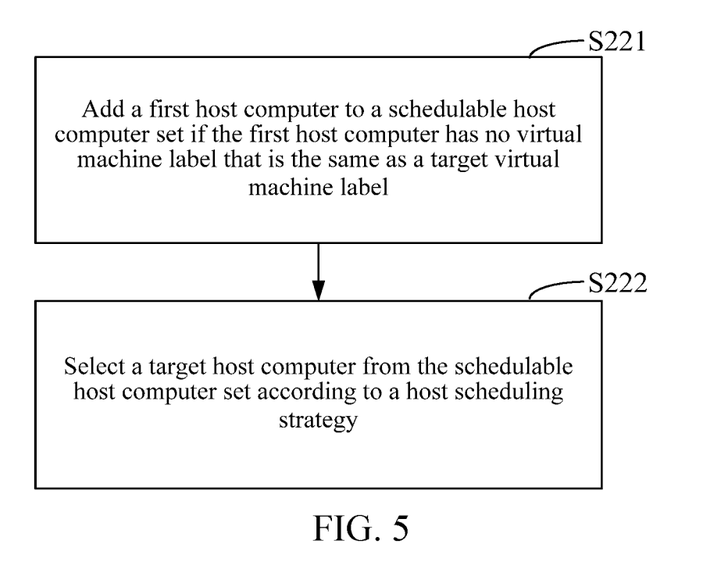
FIG. 5 shows a flowchart of determining a target host computer according to an embodiment.

In an embodiment, as shown in FIG. 5, step S220 includes:

Step S221: Add a first host computer to a schedulable host computer set if the first host computer has no virtual machine label that is the same as the target virtual machine label.

Specifically, if the first host computer has no virtual machine label that is the same as the target virtual machine label, it indicates that a service provided by each virtual machine created in the first host computer is different from a service provided by a to-be-applied virtual machine, and the first host computer may be added to the schedulable host computer set. For example, information about each schedulable host computer is stored in a form of a list.

Step S222: Select the target host computer from the schedulable host computer set according to a host scheduling policy.

Specifically, the host scheduling policy may be user-defined according to a requirement, and for example, includes a least used resource scheduling and greedy scheduling, and a most suitable target host computer is selected from the schedulable host computer set. When the virtual machine application request includes a plurality of target virtual machine labels, each target virtual machine label has a corresponding schedulable host computer set, and a final target host computer is selected from the respective schedulable host computer set. For example, a first target virtual machine label is corresponding to a first schedulable host computer set, a first target host computer is selected from the first schedulable host computer set, a second target virtual machine label is corresponding to a second schedulable host computer set, and a second target host computer is selected from the second schedulable host computer set.

In this embodiment, qualified host computers are added to the schedulable host computer set and the target host computer is determined from the schedulable host computer set, to further enhance fitness of selection of the target host computer.

In an embodiment, before step S220, the method further includes: determining a target cluster through a cluster scheduling policy according to the virtual machine application request, and sending the virtual machine application request to a cluster control server corresponding to the target cluster, so that the cluster control server returns a current virtual machine label of each host computer in the target cluster.

Figure 6:
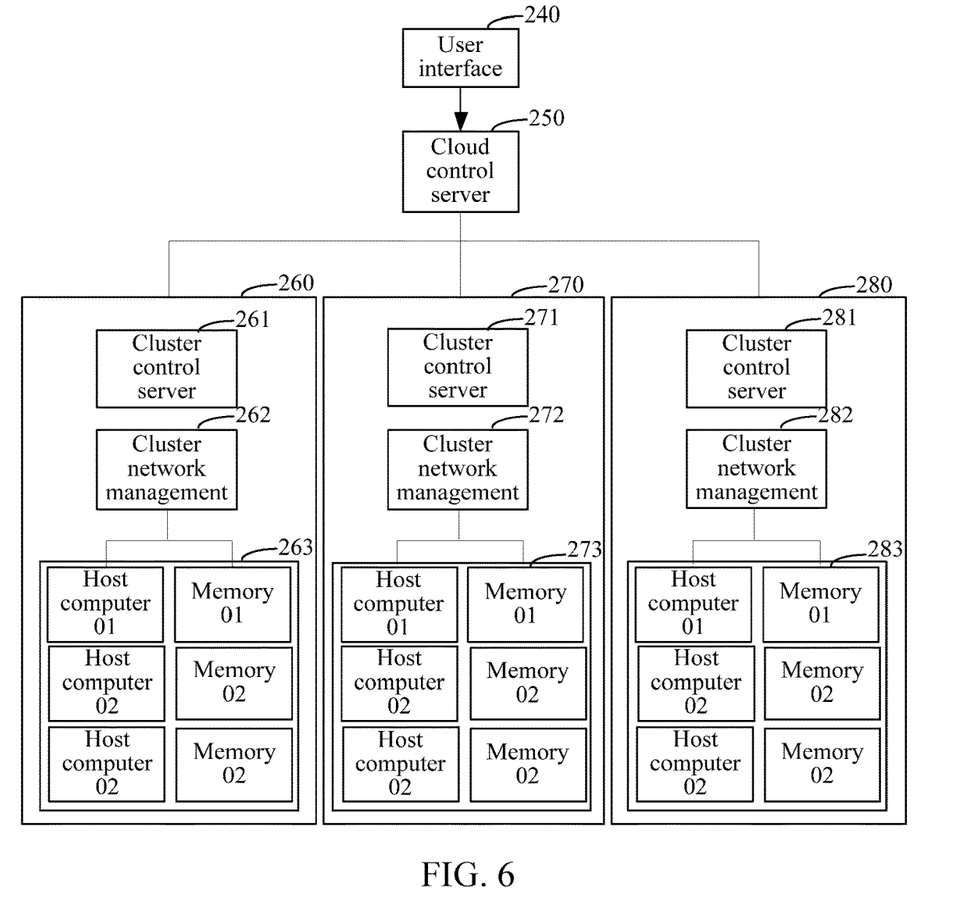
FIG. 6 shows a schematic diagram of an architecture of a resource scheduling system according to an embodiment.

Specifically, the cluster scheduling policy may be user-defined according to a requirement, and for example, includes a least used resource scheduling and greedy scheduling. If the virtual machine application request carries regional information or cluster information, a cluster matching the regional information may be obtained as the target cluster or the target cluster may be determined directly according to the cluster information, such as a cluster name. If the virtual machine application request carries virtual machine configuration information, the target cluster matching the virtual machine configuration information may also be obtained, and configuration of a virtual machine created in the target cluster is consistent with the virtual machine configuration information carried in the virtual machine application request. FIG. 6 is an architecture diagram of a resource scheduling system to which the resource scheduling method is applied. The resource scheduling system includes a terminal 240 that displays a user interface, a cloud control server 250, a cluster 260 and a corresponding cluster control server 261, cluster network management 262, a host computer set 263, a cluster 270 and a corresponding cluster control server 271, cluster network management 272, a host computer set 273, a cluster 280 and a corresponding cluster control server 281, cluster network management 282, a host computer set 283. The cluster network management is configured to manage network planning, configuration, and recovery in the cluster. The cloud control server 250 may determine a target cluster from the clusters 260, 270, and 280 through a cluster scheduling policy according to a virtual machine application request.

Step 220 includes: comparing the target virtual machine label with the current virtual machine label of each host computer in the target cluster, to determine the target host computer.

Specifically, after the target cluster is determined, the target virtual machine label only needs to be compared with the current virtual machine label of each host computer in the target cluster, to determine the target host computer, a label comparison range is limited in the target cluster, and the target cluster may be selected according to a requirement, so that not only efficiency of determining the target host computer is enhanced, but also configurability of selection of the target host computer is ensured.

In an embodiment, the virtual machine application request includes at least one of privilege information, cluster information, and virtual machine configuration information. The step of determining the target cluster through the cluster scheduling policy according to the virtual machine application request includes: checking validity of the virtual machine application request according to the information carried in the virtual machine application request, and determining the target cluster according to the information carried in the virtual machine application request and the cluster scheduling policy if checking the validity successfully.

Specifically, the privilege information refers to information related to virtual machine application privilege, and for example, includes user information and a cluster level. Different users are corresponding to different virtual machine application privileges, and a user at a higher level may apply for a virtual machine with high configuration. Whether a user has a privilege for applying for a virtual machine may be verified, and the virtual machine application request is valid if the user has the privilege. The cluster information refers to information related to the cluster, for example, cluster configuration information and cluster regional information. Whether a user satisfies a condition for applying for a virtual machine in a cluster corresponding to the cluster configuration information may be verified, and the virtual machine application request is valid if the user satisfies the condition. The virtual machine configuration information includes a memory size and CPU information of the virtual machine. Whether a user satisfies a condition for applying for a virtual machine corresponding to the virtual machine configuration information is verified, and the virtual machine application request is valid if the user satisfies the condition. The step of determining the target cluster according to the information carried in the virtual machine application request and the cluster scheduling policy is performed only when the virtual machine application request is valid, to perform virtual machine application, thereby enhancing security and configurability of virtual machine application.

In an embodiment, the target virtual machine label is classified according to a service and includes a service department name and a service module name.

Specifically, the target virtual machine label is classified according to a service, so that when a virtual machine is applied for the same service, virtual machines corresponding to the same service are deployed to different host computers, and during downtime of one host computer, other host computers can provide the same or similar service, a capability of resources to serve the outside is enhanced through scheduling resources properly, and high availability of the service is ensured. The target virtual machine label includes the service department name and the service module name, for example, "Planning Department/Website" and "Finance Department/Database". The target virtual machine label is defined by two levels, that is, the service department name and the service module name, thereby reducing repeatability of labels and enhancing description accuracy of the target virtual machine label, so that services may be classified precisely.

Figure 7:
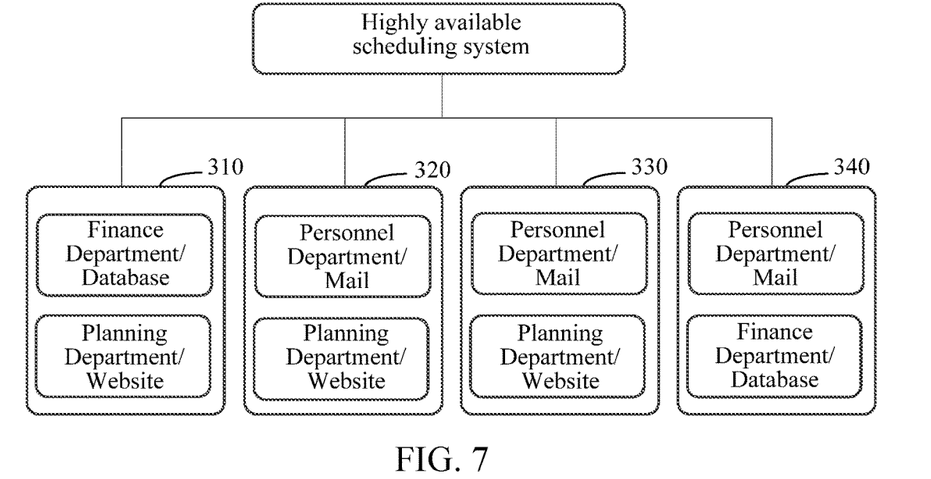
FIG. 7 shows a schematic diagram of existing resource allocation according to an embodiment.

In a specific embodiment, if the finance department needs to apply for two hosts as databases, assuming that current system resource allocation is shown in FIG. 7, a specific process of resource scheduling is as follows:

1. Receive a virtual machine application request sent by a terminal, the virtual machine application request including a target virtual machine label that is "Finance Department/Database".

2. Compare a target virtual machine label with a current virtual machine label of each host computer in a cluster. Since a host computer 310 and a host computer 340 have a virtual machine label matching the target virtual machine label, the host computer 310 and the host computer 340 cannot be used as schedulable host computers, and therefore, a host computers 320 and a host computer 330 are target host computers.

Figure 8:
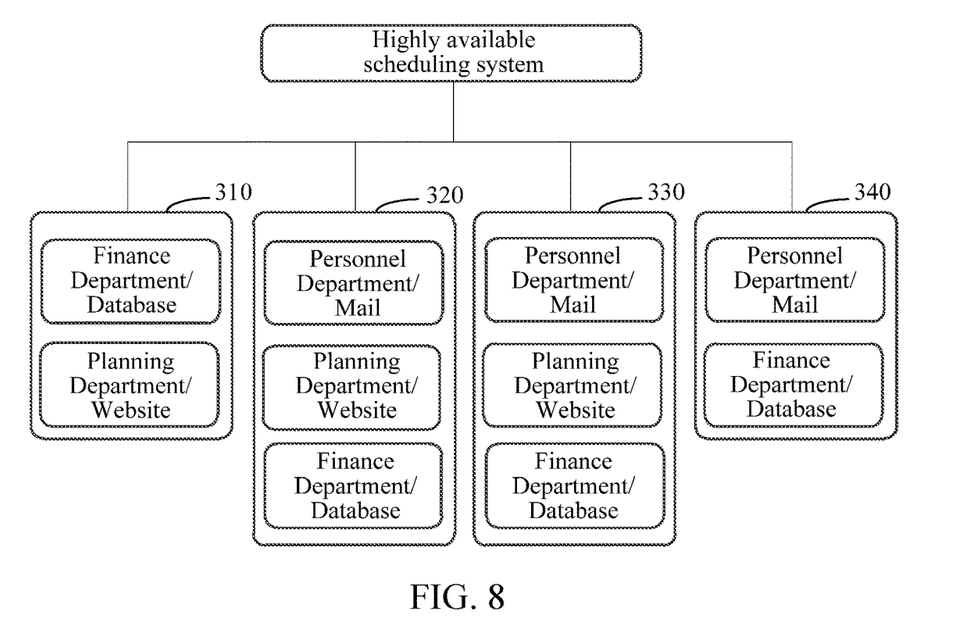
FIG. 8 shows a schematic diagram of resource allocation after resource scheduling according to an embodiment.

3. Create a first virtual machine in the host computer 320, and set a label of the first virtual machine as "Finance Department/Database"; and create a second virtual machine in the host computer 330 and set a label of the second virtual machine as "Finance Department/Database". A schematic diagram of resource allocation after resource scheduling is finished is shown in FIG. 8.

Through the foregoing resource scheduling, during downtime of the host computer 310, a database service may be provided for the finance department through the host computer 320, 330, or 340.

Figure 9:
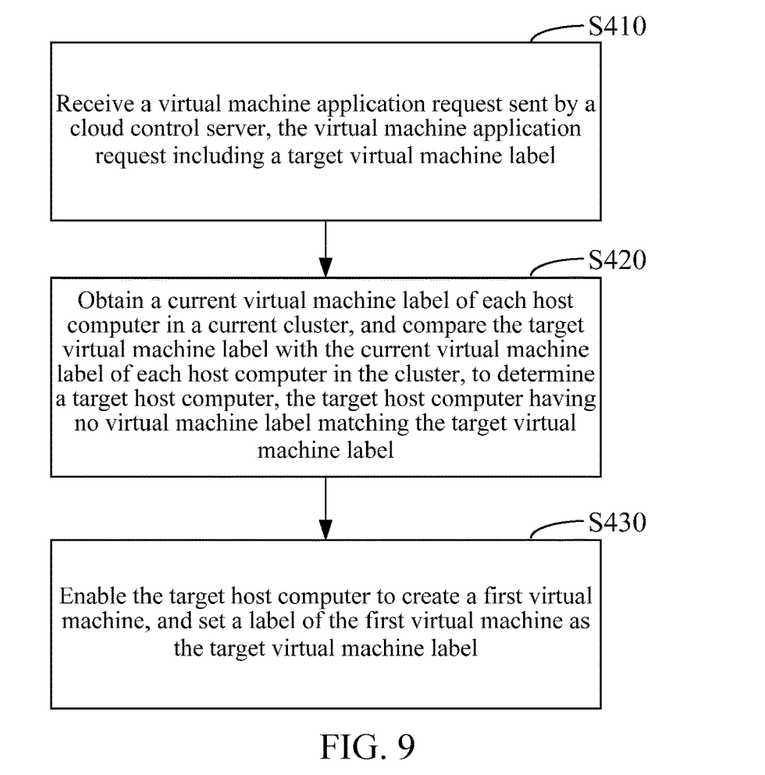
FIG. 9 shows a flowchart of another resource scheduling method according to an embodiment.

In an embodiment, as shown in FIG. 9, a resource scheduling method is provided. An example in which the method is applied in any cluster control server in the foregoing application environment is used for description. The method includes the following steps:

Step S410: Receive a virtual machine application request sent by a cloud control server, the virtual machine application request including a target virtual machine label.

Specifically, after the cloud control server determines a target cluster according to a cluster scheduling policy, the cloud control server sends the virtual machine application request to a target cluster control server corresponding to the target cluster, and the target cluster control server receives the virtual machine application request carrying the target virtual machine label. The virtual machine application request is used to determine a target host computer according to the target virtual machine label and apply for a virtual machine on the target host computer. The target virtual machine label is used to identify a service attribute of a virtual machine, the service attribute includes at least one of a use attribute and a business attribute, and different attributes may be combined to obtain the service attribute. Virtual machine labels are configured for to-be-applied virtual machines, and then, uses of the to-be-applied virtual machines may be distinguished. Therefore, a qualified target host computer is determined according to a use of a virtual machine, so as to achieve proper utilization of resources and enhance high availability. The virtual machine application request may further include more information, such as at least one of cluster area information, a cluster name, user information, and virtual machine configuration information, to obtain a target cluster or verify a user privilege by using the information carried in the virtual machine application request. The virtual machine application request may include one or more target virtual machine labels, to apply for one or more virtual machines corresponding to the target virtual machine labels at the same time.

Step 420: Obtain a current virtual machine label of each host computer in a current cluster, and compare the target virtual machine label with the current virtual machine label of each host computer in the cluster, to determine a target host computer, the target host computer having no virtual machine label matching the target virtual machine label.

Specifically, the target virtual machine label only needs to be compared with the current virtual machine label of each host computer in the target cluster, to determine the target host computer, a label comparison range is limited in the target cluster, and the target cluster may be selected according to a requirement, so that not only efficiency of determining the target host computer is enhanced, but also configurability of selection of the target host computer is ensured.

Step S430: Enable the target host computer to create a first virtual machine, and set a label of the first virtual machine as the target virtual machine label.

Specifically, after the cluster control server determines the target host computer, the cluster control server sends the virtual machine application request to the target host computer, so that the target host computer creates the first virtual machine. When creating the first virtual machine, the cluster control server allocates an appropriate amount of memory, a CPU, a network, and a magnetic disk to the first virtual machine, loads a client operating system of the first virtual machine, and sets the label of the first virtual machine as the target virtual machine label.

In this embodiment, the virtual machine application request sent by the cloud control server is received, the virtual machine application request including the target virtual machine label; the current virtual machine label of each host computer in the current cluster is obtained, and the target virtual machine label is compared with the current virtual machine label of each host computer in the cluster, to determine the target host computer, the target host computer having no virtual machine label matching the target virtual machine label; and the target host computer is enabled to create the first virtual machine, and the label of the first virtual machine is set as the target virtual machine label. Therefore, the virtual machine labels matching each other are allocated to different host computers, so that the virtual machines with the same or similar service attribute are deployed dispersedly, during downtime of one host computer, other host computers may provide the same or similar service, a capability of resources to serve the outside is enhanced through scheduling resources properly, and high availability of services is ensured.

In an embodiment, a target sending cluster of the virtual machine application request is determined by the cloud control server through a cluster scheduling policy according to the virtual machine application request sent by a terminal.

Specifically, the terminal may receive an input target virtual machine label through a virtual machine application page, such as a website, generate a corresponding virtual machine application request according to the target virtual machine label, and send the virtual machine application request to a cloud control server that may be a private cloud control server. The cluster scheduling policy may be user-defined according to a requirement, and for example, includes a least used resource scheduling and greedy scheduling. If the virtual machine application request carries regional information or cluster information, a cluster matching the regional information may be obtained as the target cluster or the target cluster may be determined directly according to the cluster information, such as a cluster name. If the virtual machine application request carries virtual machine configuration information, the target cluster matching the virtual machine configuration information may also be obtained, and configuration of a virtual machine created in the target cluster is consistent with the virtual machine configuration information carried in the virtual machine application request.

Figure 10:
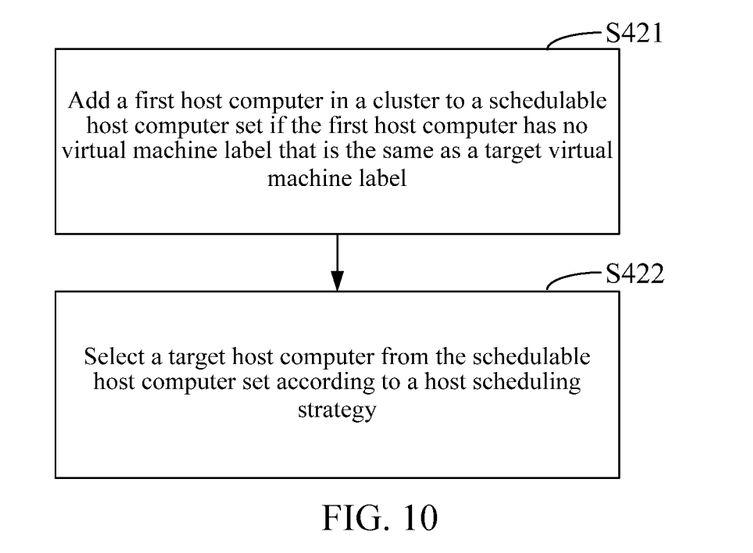
FIG. 10 shows a flowchart of determining a target host computer according to an embodiment.

In an embodiment, as shown in FIG. 10, step S420 includes:

Step S421: Add a first host computer in the cluster to a schedulable host computer set if the first host computer has no virtual machine label that is the same as the target virtual machine label.

Specifically, if the first host computer has no virtual machine label that is the same as the target virtual machine label, it indicates that a service provided by each virtual machine created in the first host computer is different from a service provided by a to-be-applied virtual machine, and the first host computer may be added to the schedulable host computer set. For example, information about each schedulable host computer is stored in a form of a list.

Step S422: Select the target host computer from the schedulable host computer set according to a host scheduling policy.

Specifically, the host scheduling policy may be user-defined according to a requirement, and for example, includes a least used resource scheduling and greedy scheduling, and a most suitable target host computer is selected from the schedulable host computer set. When the virtual machine application request includes a plurality of target virtual machine labels, each target virtual machine label has a corresponding schedulable host computer set, and a final target host computer is selected from the respective schedulable host computer set. For example, a first target virtual machine label is corresponding to a first schedulable host computer set, a first target host computer is selected from the first schedulable host computer set, a second target virtual machine label is corresponding to a second schedulable host computer set, and a second target host computer is selected from the second schedulable host computer set.

In this embodiment, qualified host computers are added to the schedulable host computer set and the target host computer is determined from the schedulable host computer set, to further enhance fitness of selection of the target host computer.

In an embodiment, the target virtual machine label is classified according to a service and includes a service department name and a service module name.

Specifically, the target virtual machine label is classified according to a service, so that when a virtual machine is applied for the same service, virtual machines corresponding to the same service are deployed to different host computers, and during downtime of one host computer, other host computers can provide the same or similar service, a capability of resources to serve the outside is enhanced through scheduling resources properly, and high availability of the service is ensured. The target virtual machine label includes the service department name and the service module name, for example, "Planning Department/Website" and "Finance Department/Database". The target virtual machine label is defined by two levels, that is, the service department name and the service module name, thereby reducing repeatability of labels and enhancing description accuracy of the target virtual machine label, so that services may be classified precisely.

Figure 11:
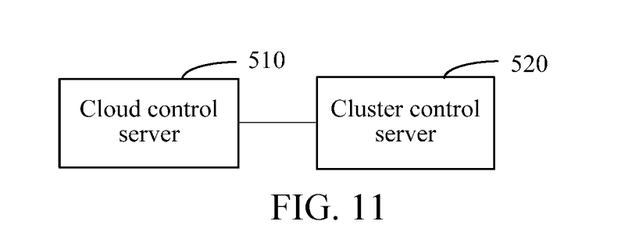
FIG. 11 shows a structural block diagram of a resource scheduling system according to an embodiment.

In an embodiment, as shown in FIG. 11, a resource scheduling system is provided and includes:

a cloud control server 510, configured to: receive a virtual machine application request sent by a terminal, the virtual machine application request including a target virtual machine label; determine a target cluster through a cluster scheduling policy according to the virtual machine application request; and forward the virtual machine application request to a cluster control server corresponding to the target cluster; and the cluster control server 520, configured to: obtain a current virtual machine label of each host computer in a current cluster, and compare the target virtual machine label with the current virtual machine label of each host computer in the cluster, to determine a target host computer, the target host computer having no virtual machine label matching the target virtual machine label; and enable the target host computer to create a first virtual machine, and set a label of the first virtual machine as the target virtual machine label.

In this embodiment, through cooperation of the cloud control server and the cluster control server, the cloud control server determines the target cluster according to the cluster scheduling policy, a label comparison range is limited in the target cluster, and the target cluster may be selected according to a requirement, so that not only efficiency of determining the target host computer is enhanced, but also configurability of selection of the target host computer is ensured. The virtual machine labels matching each other are allocated to different host computers, and then the virtual machines with the same or similar service attribute are deployed dispersedly, during downtime of one host computer, other host computers may provide the same or similar service, a capability of resources to serve the outside is enhanced through scheduling resources properly, and high availability of services is ensured.

In an embodiment, the cluster control server is further configured to add a first host computer in the current cluster to a schedulable host computer set if the first host computer has no virtual machine label that is the same as the target virtual machine label, and select the target host computer from the schedulable host computer set according to a host scheduling policy.

In an embodiment, the target virtual machine label is classified according to a service and includes a service department name and a service module name.

Figure 12:
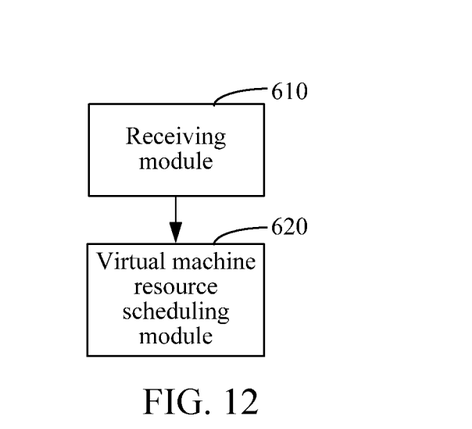
FIG. 12 shows a structural block diagram of a resource scheduling apparatus according to an embodiment.

In an embodiment, as shown in FIG. 12, a resource scheduling apparatus is provided and includes:

a receiving module 610, configured to receive a virtual machine application request sent by a terminal, the virtual machine application request including a target virtual machine label; and a virtual machine resource scheduling module 620, configured to: compare the target virtual machine label with a current virtual machine label of each host computer in a cluster, to determine a target host computer, the target host computer having no virtual machine label matching the target virtual machine label; and enable the target host computer to create a first virtual machine, and set a label of the first virtual machine as the target virtual machine label.

Figure 13:
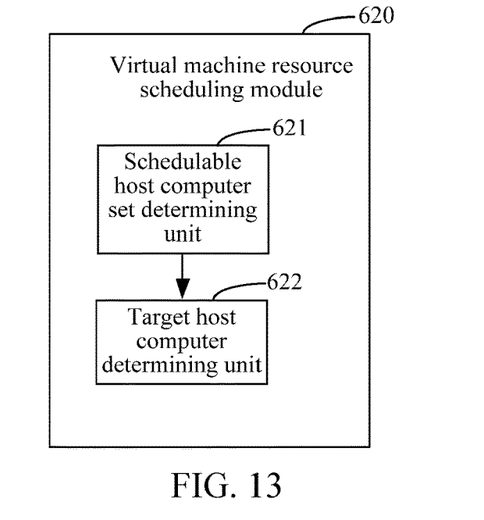
FIG. 13 shows a structural block diagram of a virtual machine resource scheduling module according to an embodiment.

In an embodiment, as shown in FIG. 13, the virtual machine resource scheduling module 620 includes:

a schedulable host computer set determining unit 621, configured to add a first host computer to a schedulable host computer set if the first host computer has no virtual machine label that is the same as the target virtual machine label; and a target host computer determining unit 622, configured to select the target host computer from the schedulable host computer set according to a host scheduling policy.

Figure 14:
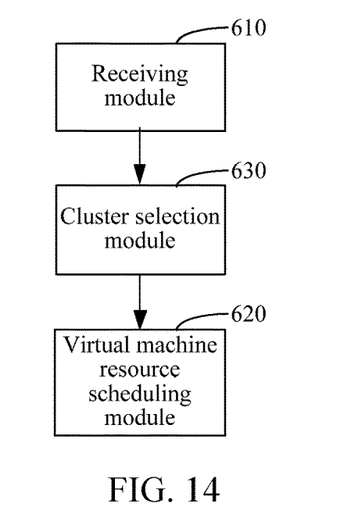
FIG. 14 shows a structural block diagram of a resource scheduling apparatus according to another embodiment.

In an embodiment, as shown in FIG. 14, the apparatus further includes:

a cluster selection module 630, configured to: determine a target cluster through a cluster scheduling policy according to the virtual machine application request, and send the virtual machine application request to a cluster control server corresponding to the target cluster, so that the cluster control server returns a current virtual machine label of each host computer in the target cluster, where the virtual machine resource scheduling module 620 is further configured to compare the target virtual machine label with the current virtual machine label of each host computer in the cluster.

In an embodiment, the target virtual machine label is classified according to a service and includes a service department name and a service module name.

Figure 15:
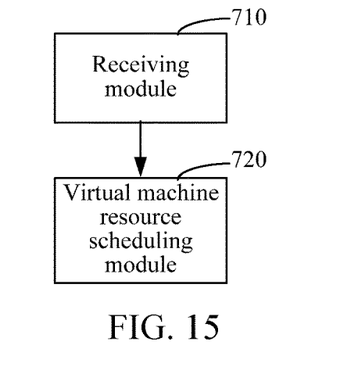
FIG. 15 shows a structural block diagram of another resource scheduling apparatus according to an embodiment.

In an embodiment, as shown in FIG. 15, a resource scheduling apparatus is provided and includes:

a receiving module 710, configured to receive a virtual machine application request sent by a cloud control server, the virtual machine application request including a target virtual machine label; and a virtual machine resource scheduling module 720, configured to: obtain a current virtual machine label of each host computer in a current cluster, and compare the target virtual machine label with the current virtual machine label of each host computer in the cluster, to determine a target host computer, the target host computer having no virtual machine label matching the target virtual machine label; and enable the target host computer to create a first virtual machine, and set a label of the first virtual machine as the target virtual machine label.

In an embodiment, a target sending cluster of the virtual machine application request is determined by the cloud control server through a cluster scheduling policy according to the virtual machine application request sent by a terminal.

In an embodiment, the target virtual machine label is classified according to a service and includes a service department name and a service module name.

In an embodiment, a server is further provided, and an internal structure of the server may be shown in FIG. 2 or FIG. 3. The server includes a resource scheduling apparatus, the resource scheduling apparatus includes various modules, and each module may be implemented wholly or partially through software, hardware, or a combination thereof.

It should be understood that the steps in the embodiments of this application are not necessarily performed sequentially in the order indicated by the step labels. Unless explicitly stated in this specification, the execution of these steps is not strictly sequential, and these steps may be executed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

A person of ordinary skill in the art may understand that all or some of the processes of the methods in the foregoing embodiments may be implemented by a computer program instructing relevant hardware. The program may be stored in a non-volatile computer-readable storage medium. When the program is run, the processes of the foregoing methods in the embodiments are performed. Any reference to a memory, storage, database or another medium used in the various embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external high-speed cache. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

Technical features in the foregoing embodiments may be combined randomly. For the brevity of description, not all possible combinations of various technical features in the foregoing embodiments are described. However, as long as combinations of these technical features do not contradict each other, it should be considered that the combinations all fall within the scope of this specification.

The foregoing embodiments only describe several implementations of this application, which are described specifically and in detail, and therefore cannot be construed as a limitation to the patent scope of the present disclosure.

It should be noted that various changes and improvements may further be made by a person of ordinary skill in the art without departing from the idea of this application, and these changes and improvements all fall within the protection scope of this application. Therefore, the protection scope of this application shall be subject to the appended claims.

What is claimed is:

1. A resource scheduling method, the method comprising:
receiving, by a cloud control server, a virtual machine application request sent by a terminal, the virtual machine application request comprising a target virtual machine label to be set to a target host computer in a target cluster, the target virtual machine label representing a service attribute of a first virtual machine to be created on the target host computer;
obtaining, by the cloud control server, a plurality of current virtual machine labels associated with a plurality of host computers in the target cluster from a cluster control server corresponding to the target cluster;
comparing, by the cloud control server, the target virtual machine label with each of the plurality of current virtual machine labels to determine whether each of the plurality of current virtual machine labels matches the target virtual machine label, each of the plurality of current virtual machine labels representing a service attribute of an associated one of a plurality of virtual machines of the plurality of host computers in the target cluster;
for each of the plurality of host computers:
adding, by the cloud control server, a host computer of the plurality of host computers to a schedulable host computer set in response to the comparing indicating that an associated current virtual machine label does not match the target virtual machine label; and
excluding, by the cloud control server, the host computer from the schedulable host computer set in response to the comparing indicating that the associated current virtual machine label matches the target virtual machine label;
determining, by the cloud control server, the target host computer from the schedulable host computer set according to a host scheduling policy;
controlling, by the cloud control server, creation of the first virtual machine on the target host computer by allocating at least one of an amount of memory, a processor, or a network for the first virtual machine, and loading a client operating system of the first virtual machine onto the target host computer; and
setting, by the cloud control server, a label of the first virtual machine as the target virtual machine label.

2. The method according to claim 1, wherein prior to comparing, by the cloud control server, the target virtual machine label with each of the plurality of current virtual machine labels, the method further comprises:
determining, by the cloud control server, the target cluster through a cluster scheduling policy according to the virtual machine application request; and
wherein obtaining the plurality of current virtual machine labels comprises sending, by the cloud control server, the virtual machine application request to a cluster control server corresponding to the target cluster, so that the cluster control server returns the plurality of current virtual machine labels associated with the plurality of host computers in the target cluster.

3. The method according to claim 2, wherein the virtual machine application request comprises at least one of privilege information, cluster information, or virtual machine configuration information; and
wherein determining, by the cloud control server, the target cluster through the cluster scheduling policy according to the virtual machine application request comprises:
checking, by the cloud control server, validity of the virtual machine application request according to the information carried in the virtual machine application request; and
determining the target cluster according to the information carried in the virtual machine application request and the cluster scheduling policy when checking the validity successfully.

4. The method according to claim 1, wherein the target virtual machine label is classified according to a service and comprises a service department name and a service module name.

5. The method of claim 1, wherein the terminal is a cloud control server.

6. The method according to claim 5, wherein a target sending cluster of the virtual machine application request is determined by the cloud control server through a cluster scheduling policy according to the virtual machine application request sent by the cloud control server.

7. A resource scheduling system, the system comprising:
a cloud control server configured to:
receive a virtual machine application request sent by a terminal, the virtual machine application request comprising a target virtual machine label to be set to a target host computer in a target cluster, the target virtual machine label representing a service attribute of a first virtual machine to be created on the target host computer;
determine the target cluster through a cluster scheduling policy according to the virtual machine application request; and
forward the virtual machine application request to a cluster control server corresponding to the target cluster; and
the cluster control server configured to:
obtain a plurality of current virtual machine labels, each of the plurality of current virtual machine labels representing a service attribute of an associated one of a plurality of virtual machines of a plurality of host computers in the target cluster;
compare the target virtual machine label with each of the plurality of current virtual machine labels to determine to determine whether each of the plurality of current virtual machine labels matches the target virtual machine label;

for each of the plurality of host computers:
    add a host computer to a schedulable host computer set in response the comparison indicating that an associated current virtual machine label does not match the target virtual machine label; and
    exclude the host computer from the schedulable host computer set in response to the comparison indicating that the associated current virtual machine label matches the target virtual machine label;
determine the target host computer from the schedulable host computer set according to a host scheduling policy;
control creation of the first virtual machine on the target host computer by allocating at least one of an amount of memory, a processor, or a network for the first virtual machine, and load a client operating system of the first virtual machine onto the target host computer; and
set a label of the first virtual machine as the target virtual machine label.

8. The system according to claim 7, wherein the target virtual machine label is classified according to a service and comprises a service department name and a service module name.

9. The system according to claim 7, wherein the virtual machine application request comprises at least one of privilege information, cluster information, and virtual machine configuration information.

10. The system according to claim 7, wherein the terminal is a cloud control server.

11. A server comprising a memory and a processor, the memory storing computer readable instructions that, when executed by the processor, cause the processor to:
receive a virtual machine application request sent by a terminal, the virtual machine application request comprising a target virtual machine label to be set to a target host computer in a target cluster, the target virtual machine label representing a service attribute of a first virtual machine to be created on the target host computer;
obtain a plurality of current virtual machine labels associated with a plurality of host computers in the target cluster from a cluster control server corresponding to the target cluster;
compare the target virtual machine label with each of the plurality of current virtual machine labels to determine whether each of the plurality of current virtual machine labels matches the target virtual machine label, each of the plurality of current virtual machine labels representing a service attribute of an associated one of a plurality of virtual machines of the plurality of host computers in the target cluster;
for each of the plurality of host computers:
    add a host computer of the plurality of host computers to a schedulable host computer set in response to the comparison indicating that an associated current virtual machine label does not match the target virtual machine label; and
    exclude the host computer from the schedulable host computer set in response to the comparison indicating that the associated current virtual machine label matches the target virtual machine label;
determine the target host computer from the schedulable host computer set according to a host scheduling policy; and
control creation of the first virtual machine on the target host computer by allocating at least one of an amount of memory, a processor, or a network for the first virtual machine, and loading a client operating system of the first virtual machine onto the target host computer; and
set a label of the first virtual machine as the target virtual machine label.

12. The server according to claim 11, wherein the instructions, when executed by the processor, further cause the processor to, before comparison of the target virtual machine label with each of the plurality of current virtual machine labels:
determine the target cluster through a cluster scheduling policy according to the virtual machine application request; and
in order to obtain the plurality of current virtual machine labels, send the virtual machine application request to a cluster control server corresponding to the target cluster, so that the cluster control server returns the current virtual machine label of each host computer in the target cluster.

13. The server according to claim 11, wherein the virtual machine application request comprises at least one of privilege information, cluster information, and virtual machine configuration information; and
wherein the instructions, when executed by the processor, cause the processor to determine the target cluster through a cluster scheduling policy according to the virtual machine application request, by:
checking validity of the virtual machine application request according to the information carried in the virtual machine application request; and
determining the target cluster according to the information carried in the virtual machine application request and the cluster scheduling policy if checking the validity successfully.

14. The server according to claim 11, wherein the target virtual machine label is classified according to a service and comprises a service department name and a service module name.

15. The server according to claim 11, wherein the terminal is a cloud control server.

16. The server according to claim 15, wherein a target sending cluster of the virtual machine application request is determined by the cloud control server through a cluster scheduling policy according to the virtual machine application request sent by the cloud control server.

* * * * *